United States Patent
Kang et al.

(10) Patent No.: US 8,801,958 B2
(45) Date of Patent: Aug. 12, 2014

(54) TITANIUM ETCHANT COMPOSITION AND METHOD OF FORMING A SEMICONDUCTOR DEVICE USING THE SAME

(75) Inventors: Dong-Min Kang, Seoul (KR); Heon jin Park, Suwon-si (KR); Kyoochul Cho, Yongin-si (KR); Baiksoon Choi, Gyeonggi-do (KR); Seunghyun Ahn, Suwon-si (KR); Jeong Kwon, Ulsan (KR); JungIg Jeon, Ulsan (KR)

(73) Assignees: Samsung Electronics Co., Ltd., Suwon-si, Gyeonggi-do (KR); Samyoung Pure Chemicals Co., Ltd., Seoul (KR)

( * ) Notice: Subject to any disclaimer, the term of this patent is extended or adjusted under 35 U.S.C. 154(b) by 296 days.

(21) Appl. No.: 13/075,430

(22) Filed: Mar. 30, 2011

(65) Prior Publication Data
US 2011/0240912 A1    Oct. 6, 2011

(30) Foreign Application Priority Data

Mar. 30, 2010   (KR) ........................ 10-2010-0028704

(51) Int. Cl.
*C09K 5/00* (2006.01)
*C09K 13/04* (2006.01)
*C09K 13/08* (2006.01)

(52) U.S. Cl.
USPC ........ 252/79.1; 252/79.2; 252/79.3; 252/79.4; 252/79.5

(58) Field of Classification Search
None
See application file for complete search history.

(56) References Cited

U.S. PATENT DOCUMENTS

| | | | |
|---|---|---|---|
| 3,992,235 A | 11/1976 | Garbarini | |
| 7,737,033 B2 * | 6/2010 | Jo et al. | 438/669 |
| 8,262,928 B2 * | 9/2012 | Kim et al. | 252/79.3 |
| 8,377,325 B2 * | 2/2013 | Suh et al. | 216/107 |
| 8,383,437 B2 * | 2/2013 | Park et al. | 438/34 |
| 2007/0235684 A1 | 10/2007 | Mistkawl et al. | |
| 2009/0286360 A1 * | 11/2009 | Jo et al. | 438/149 |
| 2011/0256712 A1 * | 10/2011 | Lee et al. | 438/652 |
| 2012/0153287 A1 * | 6/2012 | Park et al. | 257/59 |
| 2012/0252148 A1 * | 10/2012 | Park et al. | 438/34 |
| 2013/0034923 A1 * | 2/2013 | Kim et al. | 438/34 |

FOREIGN PATENT DOCUMENTS

| | | |
|---|---|---|
| KR | 10-0839428 B1 | 6/2008 |
| WO | WO-2008/098593 A1 | 8/2008 |

* cited by examiner

*Primary Examiner* — Duy Deo
(74) *Attorney, Agent, or Firm* — Lee & Morse, P.C.

(57) ABSTRACT

A titanium etchant composition and a method of forming a semiconductor device using the same, the titanium etchant composition including a titanium remover; a corrosion inhibitor; and a deionized water; wherein the corrosion inhibitor includes 5-aminotetrazole.

7 Claims, 4 Drawing Sheets

TITANIUM ETCHANT COMPOSITION AND METHOD OF FORMING A SEMICONDUCTOR DEVICE USING THE SAME

BACKGROUND

1. Field

Embodiments relate to a titanium etchant composition and a method of forming a semiconductor device using the same.

2. Description of the Related Art

Titanium, as a conductive material, may be used in various fields. For example, titanium may be used in the fields of semiconductor integrated circuit devices, optoelectronic communication systems, and Micro Electro Mechanical Systems (MEMS). In semiconductor devices, titanium may be used as, e.g., a wetting layer or a seed layer for forming a metal layer such as aluminum or copper of semiconductor devices. Alternatively, titanium may be used as, e.g., an ohmic layer for reducing contact resistance between silicon and metal or a barrier layer for reducing metal diffusion. Accordingly, a process for etching a titanium-containing layer may be desirable in the semiconductor manufacturing process.

SUMMARY

Embodiments are directed to a titanium etchant composition and a method of forming a semiconductor device using the same.

The embodiments may be realized by providing a titanium etchant composition including a titanium remover; a corrosion inhibitor; and a deionized water; wherein the corrosion inhibitor includes 5-aminotetrazole.

The 5-aminotetrazole may be included in an amount of about 0.001 wt % to about 5 wt %, based on a total weight of the titanium etchant composition.

The titanium remover may include fluoride.

The titanium remover may include at least one of ammonium fluoride, ammonium bifluoride, tetramethyl ammonium fluoride, and hydrofluoric acid.

The titanium remover may be included in an amount of about 0.001 wt % to about 10 wt %, based on a total weight of the titanium etchant composition.

The deionized water may be included in an amount of about 85 wt % to about 99.998 wt %, based on a total weight of the titanium etchant composition.

The titanium etchant composition may be formulated to be simultaneously applied to an exposed surface of a titanium-containing layer and a material layer not containing titanium and to selectively remove the titanium-containing layer.

The material layer not containing titanium may include a metal having an ionization energy greater than about 6.8281 eV.

The material layer not containing titanium may include at least one of nickel, copper, tin, lead, and silver.

The embodiments may also be realized by providing a method of forming a semiconductor device, the method including simultaneously exposing a titanium-containing layer and a material layer not containing titanium on a substrate; and selectively removing the titanium-containing layer by applying a titanium etchant composition, wherein the titanium etchant composition includes a titanium remover, a corrosion inhibitor, and deionized water, and the corrosion inhibitor includes 5-aminotetrazole.

Applying the titanium etchant composition may be performed at a temperature of about 25° C. to about 60° C. for about 1 minute to about 5 minutes.

The method may further include dipping and spinning the substrate in ultra pure deionized water; and drying the substrate.

Simultaneously exposing the titanium-containing layer and the material layer not containing titanium may include providing a substrate having via holes therein; conformally forming a titanium-containing layer over the substrate including the via holes such that the titanium-containing layer covers an inner wall of the via holes; and forming a redistribution pattern partially exposing the titanium-containing layer, wherein the redistribution pattern includes a metal layer not containing titanium.

The 5-aminotetrazole may be included in an amount of about 0.001 wt % to about 5 wt %, based on a total weight of the titanium etchant composition.

The titanium remover may include fluoride.

The titanium remover may include at least one of ammonium fluoride, ammonium bifluoride, tetramethyl ammonium fluoride, and hydrofluoric acid.

The titanium remover may be included in an amount of about 0.001 wt % to about 10 wt %, based on a total weight of the titanium etchant composition.

The material layer not containing titanium may include a metal having an ionization energy greater than about 6.8281 eV.

The material layer not containing titanium may include at least one of nickel, copper, tin, lead, and silver.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
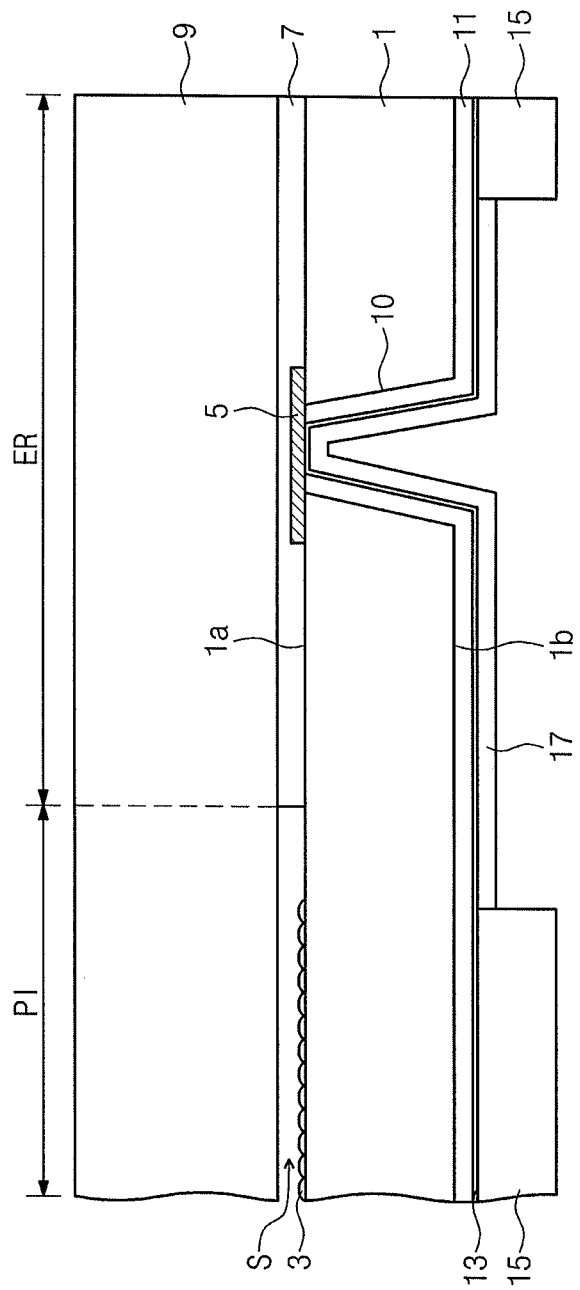
FIGS. 1 through 3 sequentially illustrate stages in a method of forming a semiconductor device according to an embodiment.

Korean Patent Application No. 10-2010-0028704, filed on Mar. 30, 2010, in the Korean Intellectual Property Office, and entitled: "Titanium Etchant Composition and Method of Forming a Semiconductor Device Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
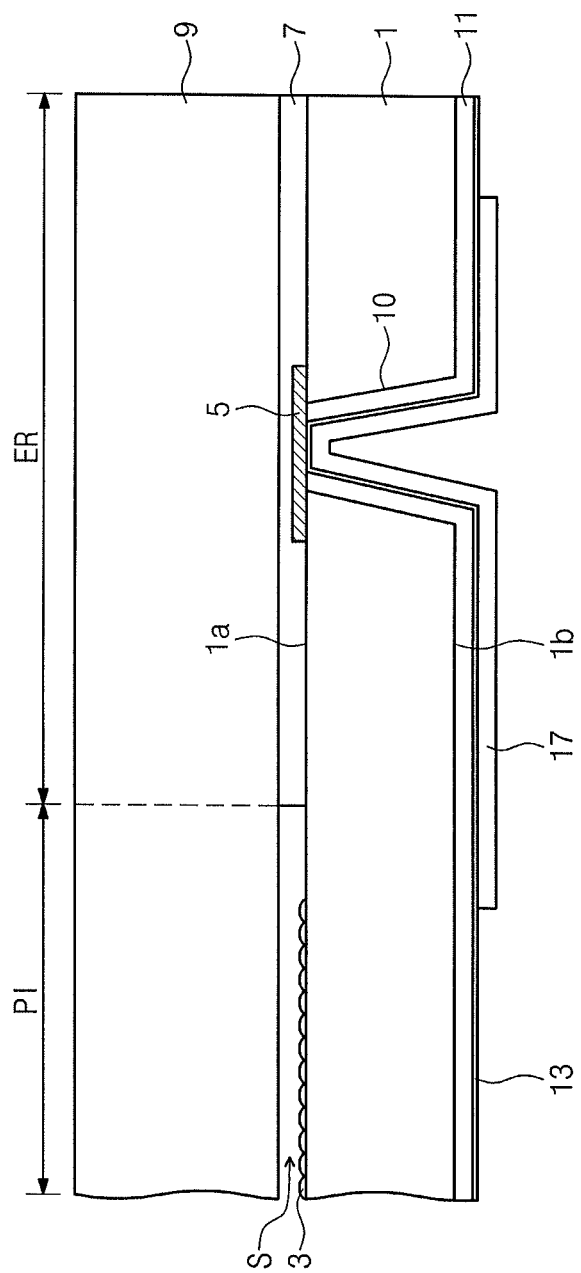
Figure 3:
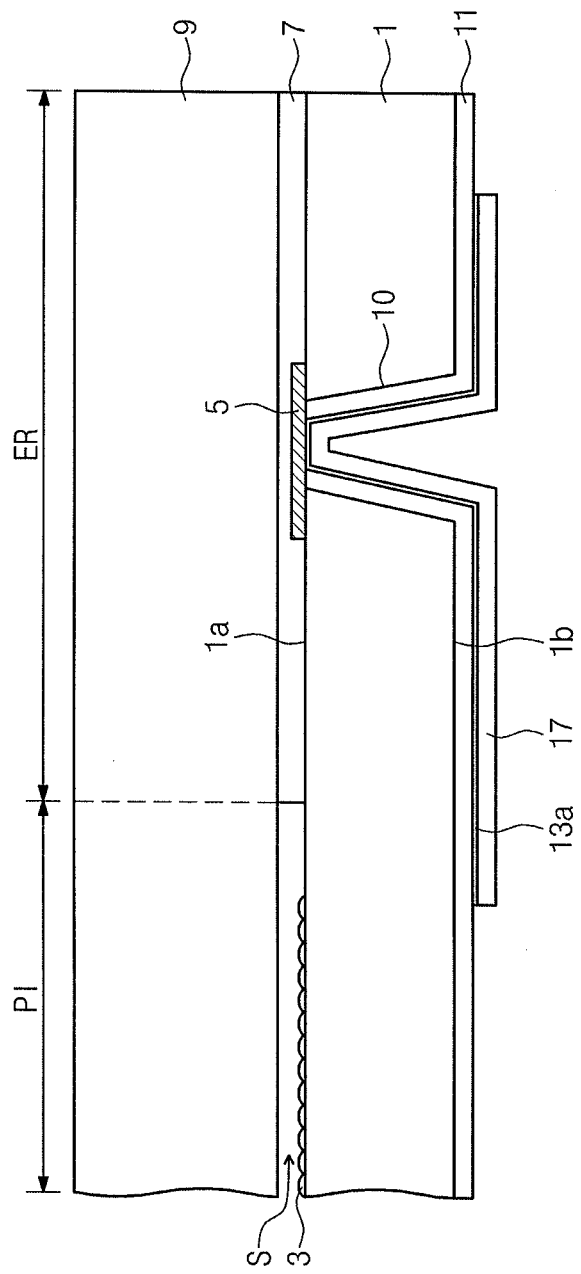

FIGS. 1 through 3 sequentially illustrate stages in a method of forming a semiconductor device according to an embodiment.

Referring to FIG. 1, a semiconductor chip 1 having a pixel region PI and edge region ER may be provided. Although not illustrated, the semiconductor chip 1 may include a semiconductor substrate and a plurality of unit pixels disposed in the pixel region PI. In the semiconductor substrate of the respective unit pixels, photoelectric conversion regions may be formed. A plurality of transistors and interconnections to sense chargers generated from the photoelectric conversion regions may be formed on the semiconductor substrate. The interconnections and transistors may be covered by interlayer dielectrics.

In the pixel region PI, micro lenses 3 overlapping respective unit pixels may be disposed on an uppermost portion 1a of the semiconductor chip 1. In the edge region ER, a connection terminal 5 for establishing an electrical connection with the outside may be formed on the uppermost portion 1a of the semiconductor chip 1. After forming the semiconductor chip 1 as described above, an adhesive pattern 7 covering the connection terminal 5 and surroundings thereof may be formed in the edge region ER of the semiconductor chip 1. A transparent substrate 9 may be disposed on the semiconductor substrate 1. The transparent substrate 9 may be bonded to the semiconductor substrate 1 by the adhesive pattern 7. Due to the thickness of the adhesive pattern 7, an empty space S may be formed between the transparent substrate 9 and the micro lenses 3 in the pixel region PI. After bonding the transparent substrate 9, a backside of the semiconductor chip 1 may be partially removed thereby forming a via hole 10 and exposing a back surface 1b of the connection terminal 5. Then, a lower dielectric 11 may be conformally formed on the back surface 1b of the semiconductor chip 1 having the via hole 10 thereon. The lower dielectric 11 may be formed by, e.g., depositing silicon oxide layer using a low temperature chemical vapor deposition (LPCVD) process. By partially removing the lower dielectric 11, the back surface of the connection terminal 5 may be exposed. Then, a titanium-containing layer 13, as a seed layer, may be conformally formed over the entire back surface 1b of the semiconductor chip 1. In an implementation, the titanium-containing layer 13 may be a single layer of pure titanium. In another implementation, the titanium-containing layer 13 may be a double layer including a stack of titanium and copper layers. For example, the titanium-containing layer 13 may be titanium nitride (TiN) or titanium tungsten (TiW).

After forming the titanium-containing layer 13, a photoresist pattern 15 defining a redistribution pattern in the back surface 1b of the semiconductor chip 1 may be formed. The photoresist pattern 15 may partially expose the titanium-containing layer 13 covering a sidewall of the via hole 10 and surroundings thereof. Subsequently, using an electroplating method, a redistribution pattern 17 may be formed on the exposed titanium-containing layer 13. The redistribution pattern 17 may be formed of a metal having an ionization energy greater than that of titanium. For example, the redistribution pattern 17 may include at least one of copper, nickel, tin, lead, and silver.

Referring to FIG. 2, the photoresist pattern 15 may be removed. Accordingly, portions of the titanium-containing layer 13 having been covered by the photoresist pattern may be exposed. As a result, both the titanium-containing layer 13 and the redistribution pattern 17 may be simultaneously exposed.

Referring to FIG. 3, by treating the simultaneously exposed surface of the titanium-containing layer 13 and the redistribution pattern 17 with a titanium etchant composition according to an embodiment, the exposed titanium-containing layer 13 may be removed. Treating with the titanium etchant composition may be carried out by, e.g., dipping and spinning the semiconductor substrate in the titanium etchant composition. Preferably, this treatment may be performed at a temperature of about room temperature, e.g., about 25° C., and about 60° C. for approximately 1-5 minutes. The titanium etchant composition may include, e.g., a titanium remover, a corrosion inhibitor, and deionized water. The corrosion inhibitor may include 5-aminotetrazole.

The 5-aminotetrazole may have a structure represented by Chemical Formula 1 below:

[Chemical Formula 1]

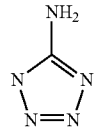

The 5-aminotetrazole may be included in an amount of about 0.001 to about 5 wt %, based on a total weight of the titanium etchant composition.

The titanium remover may include fluoride. In an implementation, the titanium remover may include at least one of, e.g., ammonium fluoride ([NH$_4$]F), ammonium bifluoride ([NH$_4$][HF$_2$]), tetramethyl ammonium fluoride (TMAF), and hydrofluoric acid (HF). The titanium remover may be included in an amount of about 0.001 to about 10 wt %, based on the total weight of the titanium etchant composition. The deionized water may be included in an amount of about 85 to about 99.998 wt %, based on the total weight of the titanium etchant composition.

After selectively removing the exposed titanium-containing layer 13 using the titanium etchant composition, the semiconductor substrate may be dipped and spun in ultra pure deionized water. Thereafter, drying process using inert gases, e.g., argon or nitrogen, may be carried out.

Then, although not illustrated, a passivation layer covering the back surface 1b of the semiconductor chip 1 as partially exposing the redistribution pattern 17 may be formed. A bump, e.g., a solder ball, contacting the redistribution pattern 17 exposed through the passivation layer may be formed.

The 5-aminotetrazole included in the titanium etchant composition according to an embodiment may be well absorbed, through an electrostatic force, by a metal layer having substantially greater ionization energy than titanium, thereby protecting the metal layer. For example, the metal layer may have an ionization energy substantially greater than about 6.8281 eV (e.g., the ionization energy of titanium). The metal layer may correspond to the redistribution layer 17. Further, the 5-aminotetrazole may not damage a polyimide, silicon oxide, silicon oxynitride, and/or silicon nitride layer.

Accordingly, when selectively removing the titanium-containing layer 13 using the titanium etchant composition as illustrated in FIGS. 2 and 3, the redistribution pattern 17 and the lower dielectric 11 may not be damaged.

Hereinafter, experimental examples of the titanium etchant composition of the present inventive concepts will be explained.

The following Experiments are provided in order to set forth particular details of one or more embodiments. However, it will be understood that the embodiments are not limited to the particular details described. Further, Comparative Examples are set forth to highlight certain characteristics of certain embodiments, and are not to be construed as either limiting the scope of the invention as exemplified in the Examples or as necessarily being outside the scope of the invention in every respect.

Experiment 1

In Experiment 1, five solutions were prepared to have compositions of Solution 1 through Solution 5 of Table 1, below.

TABLE 1

|  | Water (wt %) | HF(wt %) | 5-aminotetrazole (wt %) |
|---|---|---|---|
| Solution 1 | 99.50 | 0.50 | 0 |
| Solution 2 | 98.04 | 1.96 | 0 |
| Solution 3 | 99.47 | 0.50 | 0.03 |
| Solution 4 | 98.01 | 1.96 | 0.03 |
| Solution 5 | 90.88 | 9.09 | 0.03 |

To evaluate Solutions 1 to 5, five (5) same test wafers were prepared. Respective wafers were prepared as follows. First, a silicon oxide layer was formed on a silicon substrate. Next, a titanium layer was formed on the silicon substrate having the silicon oxide layer thereon. Then, copper patterns, nickel patterns, tin/lead patterns or tin/silver patterns were formed on the titanium layer. The titanium layer was exposed between the patterns.

After preparing the five (5) same test wafers, the test wafers were dipped and spun in Solutions 1 to 5 of Table 1, respectively, for one (1) minute at room temperature, e.g., about 25° C. Then, the test wafers were spun for five (5) minutes in ultra pure deionized water. Then, the test wafers were dried by an inert gas. Damage to respective material layers was evaluated using a microscope, a scanning electron microscope (SEM), auto visual inspection (AVI), and a 4-probe method. The results are illustrated in Table 2, below.

TABLE 2

|  | Titanium Removal Capability | Corrosion of copper pattern | Corrosion of nickel pattern | Corrosion of tin/lead pattern | Corrosion of tin/silver pattern | Damage to silicon oxide layer |
|---|---|---|---|---|---|---|
| Solution 1 | Excellent | A little | Severe | Moderate | Moderate | Moderate |
| Solution 2 | Excellent | A little | Severe | Moderate | Moderate | Severe |
| Solution 3 | Excellent | None | None | None | None | A little |
| Solution 4 | Excellent | None | None | None | None | A little |
| Solution 5 | Excellent | None | None | None | None | A little |

Referring to Table 2, Solutions 3 through 5 exhibited excellent titanium layer removal capabilities and little or no damaging/corroding effects on the other patterns. Therefore, it may be seen that a titanium etchant composition including 5-aminotetrazole according to an embodiment may selectively remove a titanium-containing layer without damaging other layers.

Experiment 2

In Experiment 2, a titanium etchant composition according to an embodiment and a conventional titanium etchant composition were compared.

In the conventional titanium etchant composition, benzotriazole (BTA) was included as a corrosion inhibitor, instead of 5-aminotetrazole.

First, chelating binding energies of 5-aminotetrazole and benzotriazole were analyzed with respect to a titanium layer and a nickel layer. The results are summarized in Table 3, below.

TABLE 3

|  | Binding energy with titanium layer | Binding energy with nickel layer |
|---|---|---|
| Benzotriazole | −153.8 kcal/mol | −173.5 kcal/mol |
| 5-aminotetrazole | −124.0 kcal/mol | −168.5 kcal/mol |

Referring to Table 3, the binding energy, −168.5 kcal/mol, of 5-aminotetrazole with a nickel layer was similar to the −173.5 kcal/mol of benzotriazole. However, the binding energy of 5-aminotetrazole with titanium, −120.4 kcal/mol, was smaller than the −153.8 kcal/mol of benzotriazole in terms of absolute value. As a result, 5-aminotetrazole may be better absorbed on a nickel layer but not as well absorbed on a titanium layer, when compared with benzotriazole. Accordingly, etching selectivity of the titanium etchant composition of an embodiment (containing 5-aminotetrazole) may be greater than that of a conventional titanium etchant composition (containing benzotriazole).

Experiment 3

In Experiment 3, a titanium etchant composition according to an embodiment and a conventional titanium etchant composition were compared.

In Experiment 3, Solutions 6 through 10 were prepared to have respective compositions of Table 4, below.

TABLE 4

|  | Water(wt %) | HF(wt %) | 5-aminotetrazole (wt %) | Benzotriazole (wt %) |
|---|---|---|---|---|
| Solution 6 | 99.50 | 0.50 | 0 | 0 |
| Solution 7 | 99.45 | 0.50 | 0.05 | 0 |
| Solution 8 | 98.51 | 0.49 | 1.00 | 0 |
| Solution 9 | 99.45 | 0.50 | 0 | 0.05 |
| Solution 10 | 98.51 | 0.49 | 0 | 1.00 |

Five (5) same test wafers were prepared. Titanium layers having the same thicknesses were formed on the respective wafers.

The test wafers were dipped and spun in Solutions 6 through 10, respectively, for one (1) minutes at room temperature, e.g., about 25° C. Then, the test wafers were spun for five (5) minutes in ultra pure deionized water and were dried by an inert gas. Damage to respective material layers was evaluated using a microscope, a scanning electron microscope (SEM), auto visual inspection (AVI), and a 4-probe method. The results are summarized in the graph of FIG. 4.

Figure 4:
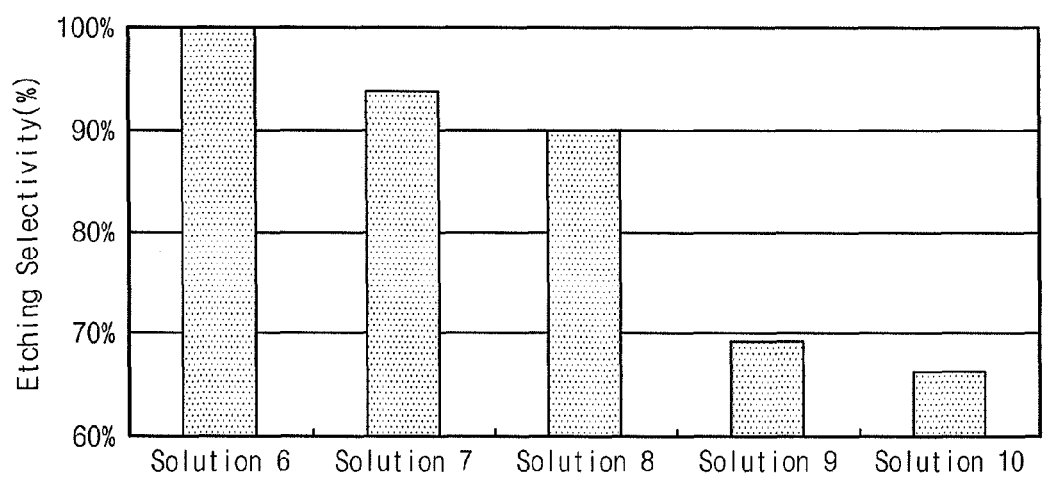
FIG. 4 illustrates a graph showing experiment results according to an embodiment.

Referring to the graph of FIG. 4, Solutions 7 and 8 exhibited a greater etching selectivity as compared with Solutions 9 and 10. Solution 6 exhibited the best etching selectivity, i.e., 100%. However, Solution 6 was the same as Solution 1 of Experiment 1. Because Solution 1 of Experiment 1 tended to corrode other metal layer, Solution 6 may not be suitable for use as an etching liquid.

Accordingly, Solutions 7 and 8 corresponding to the titanium etchant composition of an embodiment exhibited superior etching efficiency, when compared with titanium etchant compositions containing conventional titanium etching agent. Therefore, if the titanium etchant composition of an embodiment is applied to the semiconductor manufacturing process, processing time may be reduced.

The embodiments provide titanium etchant composition, which may selectively remove titanium-containing layers without damaging other layers.

The 5-aminotetrazole included in the titanium etchant composition may protect a metal layer because 5-aminotetrazole may be well absorbed by an electrostatic force on the metal having an ionization energy greater than that of titanium. Therefore, by using the titanium etchant composition according to the embodiments, a titanium-containing layer may be selectively removed without corroding other metal layers. Further, the 5-aminotetrazole may be more soluble in water than other corrosion inhibitors, so undesirable precipitation may not occur.

A method of forming a semiconductor device according to an embodiment may include using a titanium etchant composition that can selectively remove a titanium-containing layer without damaging other layers. Therefore, reliable semiconductor devices can be manufactured.

Further, using the titanium etchant composition including 5-aminotetrazole may help ensure a faster etching rate because the 5-aminotetrazole may have a smaller binding energy with a titanium-containing layer than other corrosion inhibitors. Accordingly, a method of forming a semiconductor device using the titanium etchant composition may reduce processing time.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A titanium etchant composition, consisting essentially of:
   a titanium remover;
   a corrosion inhibitor; and
   a deionized water;
   wherein:
   the corrosion inhibitor includes 5-aminotetrazole.

2. The titanium etchant composition as claimed in claim 1, wherein the 5-aminotetrazole is included in an amount of about 0.001 wt % to about 5 wt %, based on a total weight of the titanium etchant composition.

3. The titanium etchant composition as claimed in claim 1, wherein the titanium remover includes fluoride.

4. The titanium etchant composition as claimed in claim 3, wherein the titanium remover includes at least one of ammonium fluoride, ammonium bifluoride, tetramethyl ammonium fluoride, and hydrofluoric acid.

5. The titanium etchant composition as claimed in claim 1, wherein the titanium remover is included in an amount of about 0.001 wt % to about 10 wt %, based on a total weight of the titanium etchant composition.

6. The titanium etchant composition as claimed in claim 1, wherein the deionized water is included in an amount of about 85 wt % to about 99.998 wt %, based on a total weight of the titanium etchant composition.

7. A titanium etchant composition, consisting essentially of:
   a titanium remover, the titanium remover containing at least one of ammonium fluoride, ammonium bifluoride, tetramethyl ammonium fluoride, and hydrofluoric acid;
   5-aminotetrazole; and
   deionized water.

* * * * *